United States Patent [19]

Saalfrank

[11] Patent Number: 4,467,352
[45] Date of Patent: Aug. 21, 1984

[54] X-RAY DIAGNOSTIC SYSTEM COMPRISING AN IMAGE INTENSIFIER TELEVISION CHAIN

[75] Inventor: Werner Saalfrank, Erlangen, Fed. Rep. of Germany

[73] Assignee: Siemens Aktiengesellschaft, Berlin & Munich, Fed. Rep. of Germany

[21] Appl. No.: 425,312

[22] Filed: Sep. 28, 1982

[30] Foreign Application Priority Data

Jan. 22, 1982 [DE] Fed. Rep. of Germany ..... 32019882

[51] Int. Cl.³ ............................................. H04N 7/18
[52] U.S. Cl. .................................. 358/111; 358/183; 378/99
[58] Field of Search ................. 358/111, 183, 139; 378/99; 364/414

[56] References Cited

U.S. PATENT DOCUMENTS

| | | | |
|---|---|---|---|
| 3,435,136 | 3/1969 | Bachmann | 358/139 |
| 3,441,667 | 4/1969 | Novacek | 358/183 |
| 4,214,273 | 7/1980 | Brown | 358/183 |
| 4,228,465 | 10/1980 | Stone | 358/111 |
| 4,246,607 | 1/1981 | Vijverberg | 358/183 |
| 4,355,331 | 10/1982 | Georges | 358/111 |
| 4,413,277 | 11/1983 | Murray | 358/183 |

FOREIGN PATENT DOCUMENTS

1949899 12/1976 Fed. Rep. of Germany.

*Primary Examiner*—Howard W. Britton
*Attorney, Agent, or Firm*—Hill, Van Santen, Steadman & Simpson

[57] ABSTRACT

An exemplary embodiment includes a circuit for fading-in a time scale into the television image. A mark is movable over the time scale. A selector is provided for the purpose of programming times when image formation is to take place. The selected programming times are determined by the position of the mark with respect to the time scale when the selector is actuated.

1 Claim, 2 Drawing Figures

X-RAY DIAGNOSTIC SYSTEM COMPRISING AN IMAGE INTENSIFIER TELEVISION CHAIN

BACKGROUND OF THE INVENTION

The invention relates to an X-ray diagnostic system, comprising an image intensifier television chain, as well as means for fading-in data into the television image.

X-ray diagnostic systems of this type are known in which, for the diagnosing physicians, data of the most diverse type, for example data from the electrocardiogram, times, or the patient number, can be rendered visible on the viewing screen of the television display unit during the examination (German LP No. 19 49 899). In the case of X-ray diagnostic systems of this type, the desire exists, for the purpose of dose-economizing, not to operate with permanent radiation, but to pulse the X-radiation during an examination operation; namely, to start it in those times in which diagnostically relevant images occur. Such a pulsing is advisable, for example, in the case of an X-ray diagnostic system in which two chronologically successively occurring X-ray images are subtracted from one another. The one X-ray image is formed when the vessel region of interest is without contrast medium (blank image); the other is formed when the vessel region is filled with contrast medium (filling), so that the subtraction image reproduces only this vessel region. For this instance, several blank images and several filling images are formed for the image subtraction.

SUMMARY OF THE INVENTION

The object underlying the invention resides in designing an X-ray diagnostic system of the type intially cited such that the programming of those particular times during which X-radiation is started during an examination operation or during which the images are to be formed, respectively, is possible in a simple fashion.

In accordance with the invention this object is achieved by a time scale generator for the purpose of fading-in a time scale, as well as a mark movable over the time scale, and means for the programming of predetermined times for the image formation with corresponding positions of the mark in the time scale.

In the inventive X-ray diagnostic system, for the purpose of programming a chronological X-ray pulse train, or display image sequence, respectively, the mark appearing on the television display unit can be moved by means of a keyboard over the time scale which is likewise reproduced there. In those times in which the X-radiation is to be started, i.e. an image is to be formed, a key can be actuated with which the mark is set in the scale. The thus-established chronological sequence of the X-ray pulse train, or image train, respectively, can be retained in a memory for the control of the X-ray generator.

The invention shall be explained in greater detail in the following on the basis of an exemplary embodiment illustrated on the accompanying drawing sheet; and other objects, features and advantages will be apparent from this detailed disclosure and from the appended claims.

DETAILED DESCRIPTION

Figure 1:
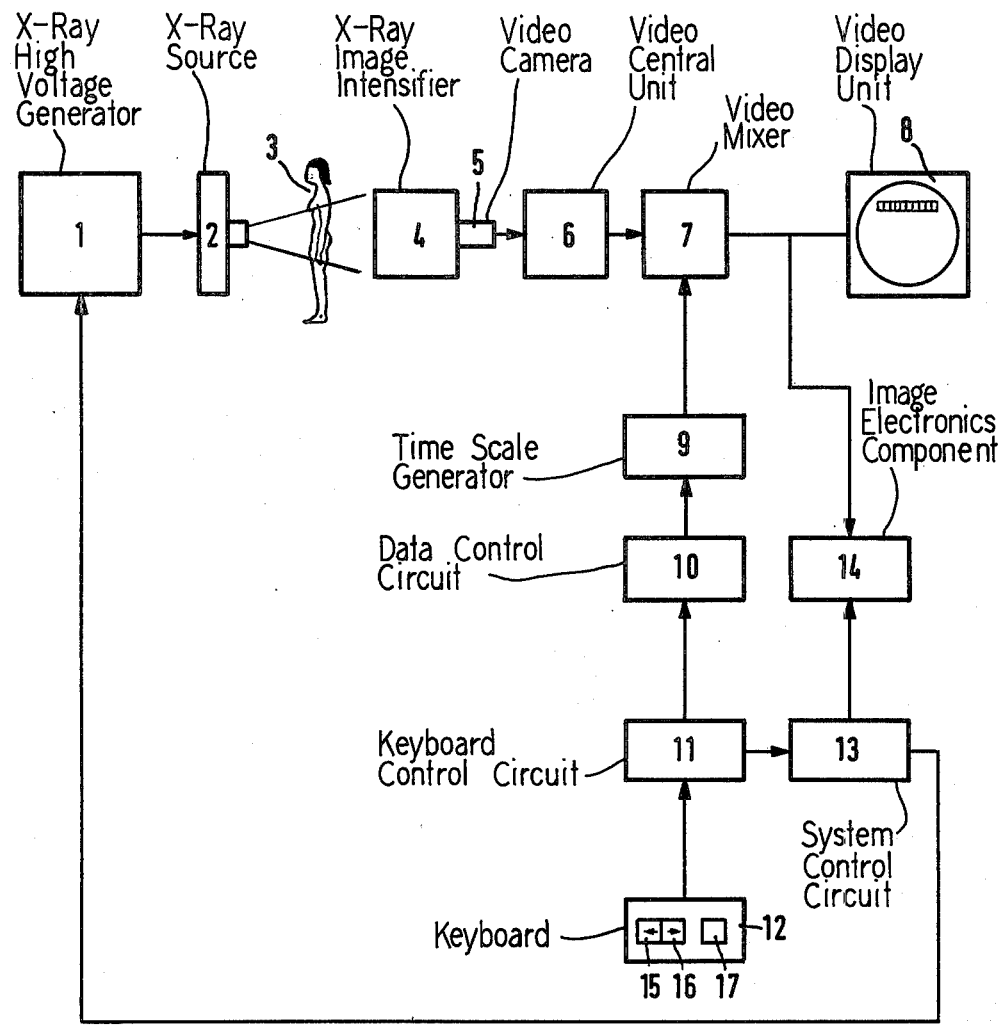
FIG. 1 illustrates an X-ray diagnostic system according to the invention.

In FIG. 1, an X-ray tube 2, fed by an X-ray high voltage generator 1, is illustrated which irradiates a patient 3 and forms X-ray images on the inlet fluorescent screen of an X-ray image intensifier 4. The output images of the X-ray image intensifier 4 are picked up by a television camera 5 and, via a television central unit 6 and a video mixer 7, are supplied to a video display unit 8 for visual reproduction.

Connected to the video mixer 7 is a time scale generator 9 which is activated via a data control circuit 10 and effects the fading-in of a time scale into the television image on the display unit 8. The data control circuit 10 is connected with a keyboard control circuit 11 to which a keyboard 12 is connected. The keyboard control circuit 11 furthermore controls, via a system control circuit 13, an image electronics component 14 and the X-ray generator 1.

Figure 2:
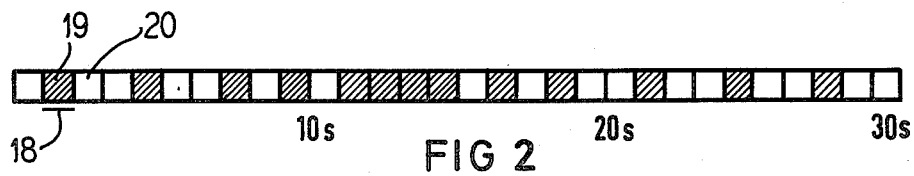
FIG. 2 illustrates a time scale for the purpose of explaining FIG. 1.

The time scale generator 9 generates, for example, a 30-second time scale such as is illustrated in FIG. 2. For the purpose of programming a chronological X-ray pulse train, or image sequence, respectively, during which the patient 3 is to be irradiated, by means of two keys 15, 16, in the keyboard 12, a mark in the time scale on the display unit 8 is moved over said time scale. Through actuation of the key 15 this mark is movable to the left, and through actuation of the key 16, the mark is movable to the right. The time scale according to FIG. 2 is e.g. subdivided into 30 time steps of a length of one second each and, in the case of those time steps in which the X-radiation is to be started, or an image is to be formed, respectively, a key 17 is depressed. Accordingly, after the start of an X-ray examination, the X-radiation is started, or an image is formed, respectively, in those times which are illustrated in FIG. 2 with hatching.

The mark which is moved over the time scale on the display unit 8 can be a luminescent dash formed as indicated at 18 in FIG. 2, or a luminescent dot or another sign. The time program established in the above-illustrated fashion for the commencement of the X-radiation, or of the image formation, respectively, can be permanently retained in a memory, for example, in the system control circuit 13, and can be recalled therefrom for an examination. It is also conceivable to establish several programs in the illustrated fashion and to recall the respectively desired program with the aid of the keyboard 12. To this end, keys for effecting program selection would additionally have to be provided on the keyboard 12. In addition, in the keyboard control circuit 11, a clock pulse generator can be present which automatically moves the mark such as 18, FIG. 2, in step-by-step fashion from left to right over the time scale on the display unit 8, whereby then only in those times in which the start of the X-radiation, or the image formation, respectively, is to proceed, does the key 17 need to be activated. The manually operated keys 15 and 16 can in this case be provided in order to conduct corrections in a fixed program. In addition, the control can also proceed in such a manner that the time mark blinks as long as no decision has yet been made regarding a programming sequence, whereas it steadily luminesces after the setting. The control of the stepping (or advancement) of the mark can also proceed via two keys, the one of which signifying Yes, and the second signifying No; i.e., the one sets a mark (as at 19, FIG. 2) signifying the start of the X-radiation or image formation respectively; the other leaves a raster space (as at 20, FIG. 2). In this case, the mark 18 is then, following actuation of one of these two keys, advanced by one step.

It will be apparent that many modifications and variations may be made without departing from the scope of the teachings and concepts of the present invention.

I claim as my invention:

1. An X-ray diagnostic system, comprising an image intensifier television chain (4, 5, 6, 7, 8), and control means (9, 10, 11, 12) for the fading-in of data into the television image, characterized in that said control means comprises a time scale generator (9) for the purpose of fading in a time scale (FIG. 2) and a mark movable over the time scale, and selector means (12) for the programming of predetermined times when image formation is to take place given corresponding positions of the mark with respect to the time scale.

* * * * *